May 22, 1951          A. F. SHIELDS          2,554,064
BRAKE SLACK ADJUSTER

Filed July 11, 1947          2 Sheets-Sheet 1

INVENTOR.
ALBERT F. SHIELDS
BY
Warren S. Orton
ATTORNEY

May 22, 1951 A. F. SHIELDS 2,554,064
BRAKE SLACK ADJUSTER
Filed July 11, 1947 2 Sheets-Sheet 2
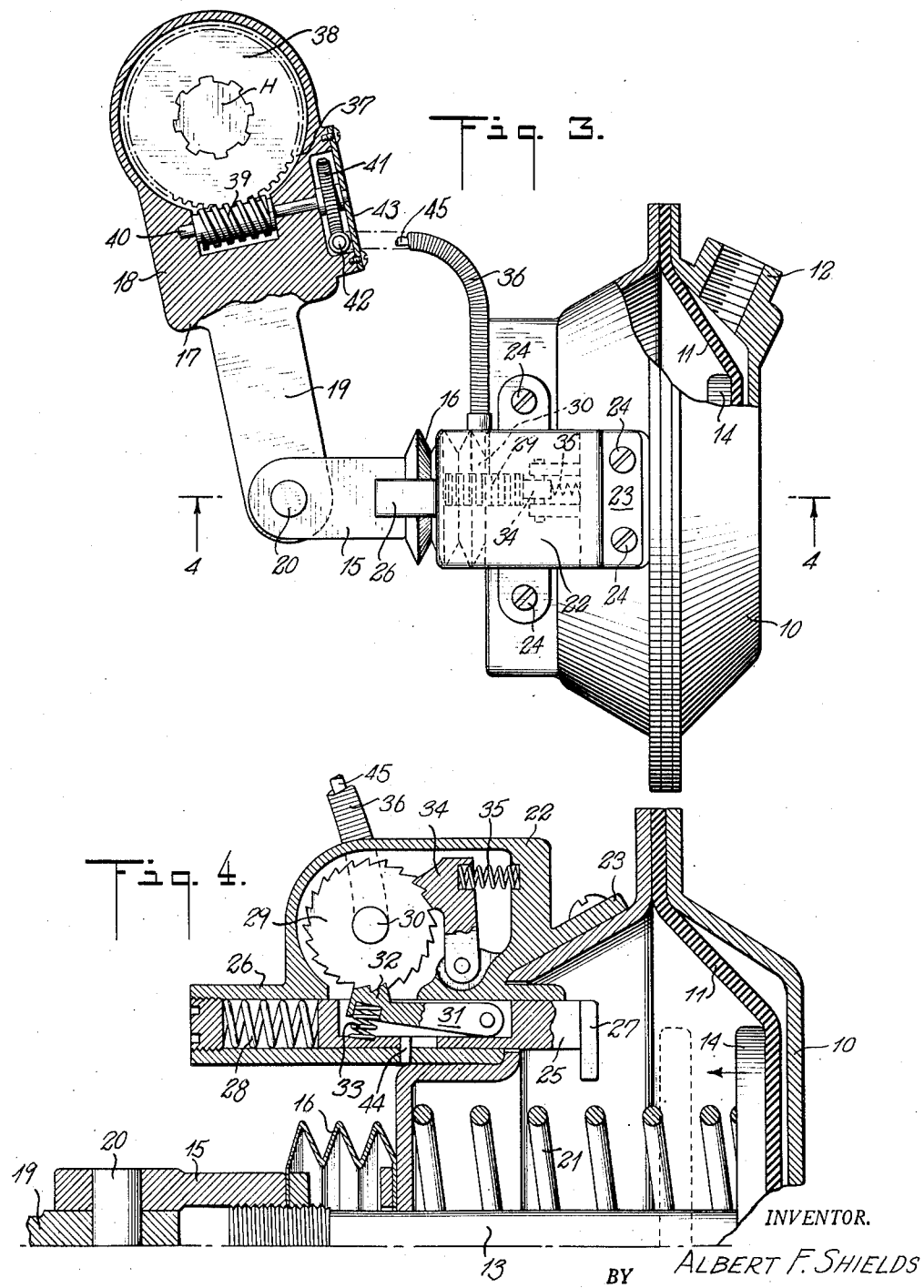
INVENTOR.
ALBERT F. SHIELDS
BY
Warren S. Orton
ATTORNEY Patented May 22, 1951

2,554,064

UNITED STATES PATENT OFFICE 2,554,064

BRAKE SLACK ADJUSTER

Albert F. Shields, Forest Hills, N. Y., assignor to Sier-Bath Gear & Pump Co., Inc., North Bergen, N. J., a corporation of New Jersey Application July 11, 1947, Serial No. 760,416

8 Claims. (Cl. 188—79.5)

The invention relates in general to an automatic slack adjuster for fluid pressure brakes and particularly relates to adjusting mechanism for use on automatic vehicle brakes in which slack in the brake operating mechanism is automatically adjusted in response to the usual brake mechanism, moving beyond its predetermined range of normal operation.

It has been known in this art to incorporate a slack adjuster or wear compensating mechanism in and as part of the usual brake applying mechanism so that an over-travel of such mechanism in its normal operation will re-adjust the brake applying mechanism in such way as will compensate automatically for wear in the operative elements of the brake applying mechanism.

These known devices have not proven entirely satisfactory in actual service particularly when installed on automotive vehicles, among other reasons mainly because they were unsafe. The parts thereof which form the wear compensating means is an integral part of the brake applying mechanism and thus a failure in their automatic slack adjuster feature would mean a complete brake failure. Further in these known devices the automatic adjuster elements are quite apt to function accidentally due to their interlocking features; to make, or at least attempt to make, an adjustment when not needed; elements were often used which could not withstand the vibration and rough usage to which normal operation would subject them, and in general such devices are so complicated in structure and operation as to render their use too expensive and in many cases not entirely suited for their intended purpose.

Accordingly, the primary object of the invention is to provide a simple form of slack adjuster which is supplemental to and thus can be regarded as an addition or an attachment to any usual form of brake actuating mechanism otherwise complete per se, and which attachment can be added as a separate unit to known form of wheel-brake actuating mechanism. In general disclosure features brake wearing compensating mechanism which will normally be inactive and thus removed from any possibility of partaking in the usual braking operation and which will come into operation only when the power generating element of the conventional brake applying mechanism moves over an excessive range of travel in its effect to cause the desired clutching action of the brakes.

Various other objects and advantages of the invention will be in part obvious from a consideration of the method features of the disclosure and from an inspection of the accompanying drawing and in part will be more fully set forth in the following particular description of one method of practicing the invention, and the invention also consists in certain new and novel modifications of the preferred method (and other features of construction and combination of parts) hereinafter set forth and claimed.

In the accompanying drawings:

Fig. 3 is an enlarged view, largely in side elevation and with parts broken away of the brake actuating device shown in the preceding figures and;

Fig. 4 is a longitudinal sectional view taken on the horizontal plane indicated by the line 4—4 of Fig. 3 with the parts of both Figs. 3 and 4 shown in their normal in-operative non-braking position.

Figure 1:
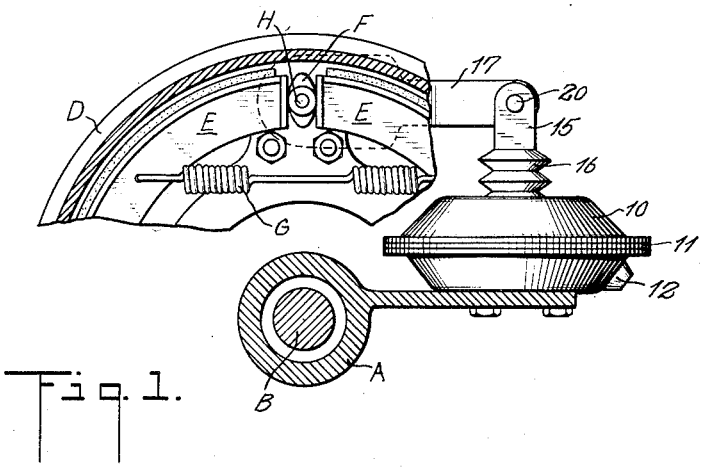
Fig. 1 is a view partly in vertical transverse section of a wheel brake drum, associated shoes and their operating cam, and partly in section showing an attachment thereto constituting a preferred embodiment of the invention and taken on the broken line 1—1 of Fig. 2.
Figure 2:
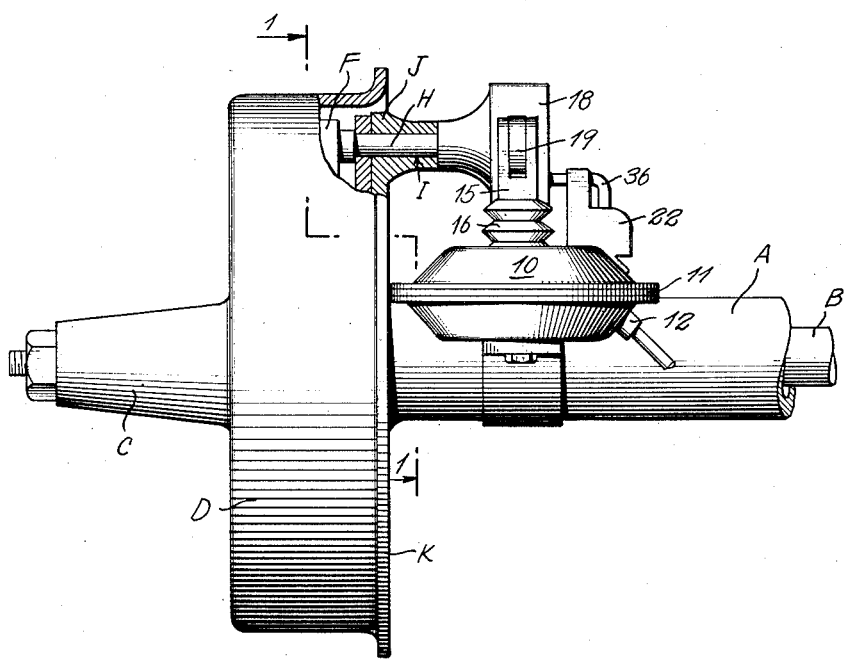
Fig. 2 is an enlarged view in side elevation of the device shown in Fig. 1.

In the drawings and referring first to conventional vehicle wheel-brake parts (illustrated in Figs. 1 and 2) there is shown an axle housing A containing a wheel driving axle B for turning wheel C and associated brake drum D. Mounted within the drum is a pair of distendible brake shoes E with an actuating double lobe cam F between their free ends and which free ends are held in engagement with the opposite long sides of the cam by a spring G. The cam is actuated by a cam shaft H mounted in bearing I in the form of a boss J projecting from a rear face plate K carried by the axle housing A and closing the rear side of the drum D, all as is used with a known type of vehicle wheel-brake.

Referring first to the mechanism which operates the cam F to distend the shoes E and thus cause the brake to function there is disclosed a source of power in this particular case shown to be of the compressed air actuated wheel-brake type. The power originates in two-part pressure containing casing 10 secured to the axle housing and between which two parts is clamped a freely swinging diaphragm 11. Compressed air is admitted conventionally to one side of the diaphragm through a tapped inlet 12.

A long main cam operating plunger 13 is slidably mounted in suitable bearing provided therefore in the casing 10 for reciprocating movement and at its inner end has a broad disk-like head 14 secured to and movable with the central portion of the diaphragm. In normal operation the diaphragm has a relatively short amplitude of swing at its center, say of sufficient extent to move the head 14 from the solid line position to the dotted line position of Fig. 4.

The plunger 13 extends through the side of the casing 10 nearest the cam shaft and has this end threaded in the portion thereof which extends exteriorly of the casing.

A clevis forming fork 15 is in adjustable threaded engagement with the projecting portion of the plunger as best shown in Fig. 4. An accordion 16 fitted to the casing and plunger defeats entrance of water or dirt to the interior of the casing through the opening in which the plunger slides. An operating arm 17 is provided with an enlarged head 18 considered for the moment as secured to the cam shaft H to rock the same. A reduced end 19 of the arm has its free end fitted between the bifurcations of the fork 15 and is pivoted thereto by pivot pin 20.

In operation, actuating air pressure admitted to the right side of the diaphragm when in the full line position shown in Fig. 4 will swing the center of the diaphragm and with it the plunger head 14 from right to left as indicated by the arrow a distance, say that measured between the full line and dotted line position of the plunger head. This action will cause the plunger 13 to shift the arm 17 in a clockwise direction from its normal position shown in Fig. 3 for a distance sufficient to act through the cam shaft H, and shift the cam F from the position shown in Fig. 1 into such angled position as will move the brake shoes E outwardly into a braking engagement with the brake drum as is usual in such cases. Releasing air pressure will permit or cause the brake actuating mechanism to return to its normal inoperative position by means forming no part of this disclosure of the brake actuating mechanism. A powerful return spring 21 is shown in Fig. 4 biased to return all parts to their normal inoperative position is suggested as one such means.

Referring now to the cam adjusting mechanism herein featured there is disclosed at the casing 10 a supplemental index mechanism containing casing 22 fitted to the casing 10 and secured thereto through outstanding flanges 23 and screws 24. Mounted within the casing 22 is cam indexing mechanism which includes an indexing plunger 25 slidably mounted for reciprocating movement in a guiding tube 26 provided therefore as part of the casing 22. The inner end of the plunger 25 is provided with a small pressure head 27 located within the casing 10 and disposed in the path of movement of the plunger head 14. It is a feature of this disclosure that the head 27 of the indexing mechanism is normally spaced from and thus completely independent of the normal amplitude of swing of the head 14, except in those cases where an excessive movement of the head 14 causes it to bear on and thus shift the indexing plunger as a whole to the left of the showing in Fig. 4. The plunger 25 is backed by a strong return spring 28 biased to move the plunger towards its normal position shown in Fig. 4, opposing displacement of the same by the diaphragm. A pin 44 in tube 26 is arranged to engage a groove in the sliding plunger 25 so that its return movement through action of spring 28 will be limited.

A ratchet wheel 29 of the one-way toothed type is secured to a shaft 30 journalled in the casing 22 and is engaged by a feed pawl 31 pivoted at its right end to the indexing plunger 25 and with its multiple toothed left end 32 maintained in racking engagement with the teeth of the wheel 29 by means of a small contact spring 33. A locking pawl 34 through compression of a small spring 35 engages the ratchet wheel 29, to defeat clockwise retreat of the ratchet wheel. A flexible drive shaft casing 36 leads from one end of the housing 22 to the head 18 of the rocking arm 17.

Within the casing 36 a flexible drive shaft 45 connects ratchet shaft 30 with a worm shaft 42 journalled in the head 18. Within a recess 37 provided therefore in one face of the head 18 is a large worm gear 38, splined to the cam shaft H as shown in Fig. 3. The worm gear is engaged by a worm 39 carried on a worm shaft 40 journalled in the head 18. A second worm gear 41 is secured to one end of the shaft 40 and this in turn is driven from a worm shaft 42 to the protruding end of which (not shown) an end of the flexible shaft 45 is secured. A cover plate 43 closes the recess 37.

The flexible shaft, of course, maintains the cam shaft H under control of the indexing mechanism in all operative positions of the arm 17 as it swings back and forth in the normal operation of applying the brakes.

In operation and assuming that in operating the mechanism to cause the brake to function the plunger 25 is shifted a distance equal to say one tooth distance on the ratchet wheel 29, at the same time the return spring 28 will, of course, be placed under compression. The feed pawl 31 will move its toothed end 32 idly past the previously engaged teeth of the wheel 29; at which time the pawl 34 will be operative to hold the ratchet wheel 29 from turning. When the actuating pressure is released from the indexing plunger head 27, the spring 28 reasserts itself and bears on the plunger 25 to shift it from left to right back into its initial and normal position limited by the pin and slot stop at 44. At the same time the toothed end 32 of the feed pawl 31 engaging an advanced set of teeth on the ratchet wheel 29 and rotates the same counter-clockwise over a small arc and which movement is permitted by the locking pawl 34.

The turning or indexing movement of the ratchet wheel 29 is transmitted through the worm gear drive formed of the connected parts 42, 41, 40, 39 and 38 to turn the cam H sufficient to take up any wear which may have occurred between the cam, the shoes and the brake drum. In this way the brake operating parts are restored to their intended operative condition even though the cam H and associated parts have become worn in use.

It is particularly noted that the cam is under control of two independent chains of connected parts. For the normal operation of the brake, the push of the diaphragm operates directly through plunger 13, fork 15, arm 17, relatively fixed worm 39 and worm gear 38 in this case acting as a lock between the arm 17 and the cam shaft H, to actuate the cam somewhat following conventional practices in this respect. This brake controlling operation can be had even if the indexing mechanism is absent or inoperative for any reason.

The other chain of connected parts operates to index, in distinction from operating the cam; and comprises plunger 25 and the indexing parts including pawl 31 and ratchet wheel 29, cable shaft 30, flexible cable 45, worm 42, worm gear 41, shaft 40, worm 39 and worm gear 38, splined to the cam shaft. Between the diaphragm 11 and the cam shaft H the necessary operating force is transmitted through the first mentioned chain of connected parts whereas the second chain merely applies a corrective adjustment when necessary without the contacting second chain to each other at any point and thus without influence one on the other.

I claim:

1. In a brake, the combination of a cam for operating the brake shoes, a cam shaft for actuating the cam, an arm mounted to turn about the shaft for rocking the same and thus actuate the cam, a worm gear fast on the shaft and housed within the arm, a worm shaft provided with a worm journalled in the arm and in driving engagement with the worm gear to adjust the same rotatively relative to the arm, a reducing gear drive journalled in the arm and including a second large worm gear secured to the worm shaft, a second worm shaft meshing with said large worm shaft, power means including a reciprocating diaphragm connected to the arm to rock the same and thus actuate the cam, indexing means normally inoperative while the reciprocating diaphragm moves back and forth in its travel to cause the cam to operate the brake, said indexing means operatively controlled and energized by a movement of the reciprocating diaphragm beyond that required to rock the arm and operate the brake and a flexible driving connection between said indexing means and the second worm shaft.

2. The combination with a cam controlled brake including a cam shaft and mechanism at all times operative to rock the cam shaft to cause the brake to function, said mechanism including a fixed casing having therein a pneumatically powered diaphragm, a chain of connected parts between the diaphragm and the cam shaft, including a main plunger actuated in one direction by the diaphragm, projecting to the outside of the casing and spring biased to return in the opposite direction, an arm loose on the cam shaft to rock about the same as a fulcrum and having a tail end pivotally connected to the projecting part of the plunger, a worm journalled in the head and a large gear fixed to the cam shaft and meshing with the worm, of a unit constituting an attachment to the brake including an indexing casing provided with means for detachably connecting the same to the outside of the fixed casing to become a fixed part of the brake, cam adjusting means including indexing means, said indexing means including an indexing plunger slidably mounted in the indexing casing, projecting therefrom into the first main casing through an opening provided therefor and disposed in the path of movement of the diaphragm, a one-way ratchet wheel contained in the indexing casing, rotated step-by-step by the indexing plunger when the plunger moves for an abnormal distance on its cam operating movement, a driving connection between the ratchet and the worm for indexing the worm and thus the cam over an arc controlled by the rotation of the ratchet, said driving connection including a flexible drive shaft having a casing fixed at one end to the indexing casing and at its other end to the rocking head.

3. In a brake mechanism, the combination of two spaced apart relatively movable structures, one of said structures formed of two units, one of said units constituting a main casing provided with means for mounting it fixedly in place and provided therein with a reciprocating main plunger and the other unit including an indexing casing provided with means for mounting it fixedly in place and the other structure including a brake actuating shaft, an arm normally loose on the shaft, a worm shaft journalled in the arm and a worm-forming reducing gear drive between the worm shaft and the brake actuating shaft, a chain of connected parts between the reciprocating plunger and the arm to rock the shaft in the normal operation of the brake mechanism, said indexing casing having a part thereof forming a guide tube, indexing mechanism within the indexing casing including an indexing plunger slidably mounted in the guide tube and operatively controlled by an abnormal movement of the main plunger and said indexing mechanism including a feed pawl and a ratchet wheel actuated by the pawl and a flexible drive bridging the space between the two relatively movable structures for transmitting rotary movement of the ratchet wheel to the worm forming the reducing gear drive.

4. In a device of the class described, the combination with a shaft, an arm mounted on the shaft for rocking movement and operatively connected for turning the shaft, a source of pneumatic power, a casing fixed in place and provided therein with a diaphragm powered from said source, means actuated by the diaphragm and connected to the arm to turn the shaft in the normal operation of the device, and mechanism carried by the arm for varying the relation of the arm to the shaft, of means forming a power transmission energized from said source including a control therefor carried by the fixed casing and provided with a plunger disposed in the path of swing of the diaphragm, controlled by an abnormal movement of the diaphragm and operatively connected to said varying mechanism to cause it to function and said power transmission means including a flexible power transmitting element connected at one end to the fixed casing and at its other end to the rocking arm to transmit power from said control to said varying mechanism on said rocking arm in all operative positions of the arm.

5. The combination with brake mechanism including a brake drum, brake shoes for engaging the drum, a cam and cam shaft for expansively distending the shoes into a clutching engagement with the drum, pneumatically actuated mechanism for actuating the cam shaft including a casing provided with a diaphragm dividing the casing into a pressure chamber and a mechanism-containing chamber, a chain of connected parts between the diaphragm and the cam shaft, said chain having a fixed length at all times and including at one end a worm gear on the cam shaft and a worm engaging the worm gear and at its other end a spring-loaded plunger intruding into the casing and having a head located in the mechanism containing chamber and engaged by the diaphragm on its braking stroke, said chain reacting on the diaphragm when the shoes bear on the drum to limit its advance on its braking stroke, of metering mechanism energized from the diaphragm and at one end operating on the worm automatically to take up slack in the chain and thus insure the engagement of the shoes with the band even in the presence of slack, said metering mechanism including a power-receiving index plunger extending parallel to, spaced from and independent of the headed plunger extending into the mechanism-containing chamber normally spaced from the head to provide a preset clearance therebetween as the head is moved by the diaphragm on its normal braking stroke, said plunger being spring-loaded and biased to project towards the diaphragm, disposed in the path of movement of and engaged by the head to cause the metering mechanism to function whenever the head is moved by the diaphragm any distance in excess of that distance necessary to take said clearance.

6. In combination with a brake system complete per se and including a drum, shoes, a spring acting on the shoes biased to move them into an inoperative, unclutched position and a cam for moving the shoes against the resistance of said spring into clutching engagement with the brake band, a pneumatic power device including a swinging diaphragm and a fixedly-coupled chain of connected parts between the diaphragm and the cam, operative to function normally on a powered swing of the diaphragm in one direction, a spring supplementing the spring acting on the shoes for swinging the diaphragm in the opposite direction, said diaphragm being limited in its amplitude of swing on its powered stroke by the movement of the shoes into their final braking position, and which chain of parts as well as the brake band and shoes is liable to develop a slack therein during use thus permitting an additional extent of amplitude of swing of the diaphragm on its working stroke before the brake functions, of an attachment to the system including normally inoperative readjustment mechanism connected to a part of the chain to take up the slack therein, said mechanism including a plunger control therefor disposed in the path of swing of the diaphragm, a spring acting thereon and biased to move the same in the direction towards the diaphragm to assist its spring and the shoe spring to return the diaphragm to its normal inoperative position, said plunger control spaced beyond the normal amplitude of swing of the diaphragm and disposed to be engaged by the diaphragm and moved thereby against the resistance of its loading spring when the diaphragm develops an abnormal amplitude of swing to cause the readjustment mechanism to function automatically as an incident of an over-travel of the diaphragm.

7. The combination of a brake assembly including a mechanical brake, a pneumatically energized power unit formed of a main casing, a diaphragm dividing the casing into two separate parts, one part forming a pressure chamber and the other part a mechanism-containing chamber, and a chain of fixedly-connected parts connecting the diaphragm with the brake and operative to cause the brake to function when pressure is admitted to the pressure chamber, said diaphragm having a normal and relatively small amplitude of swing when the chain is substantially free of slack and a greater amplitude of swing when there is slack in the chain, pneumatically-powered mechanism operating on the chain to take up automatically any slack therein, and a control for regulating the transmission of power therethrough, said control including a control casing carried by the main casing, a spring-loaded plunger guide in the control casing and having its advance end located in the mechanism-controlling chamber in position normally spaced from the diaphragm when on its normal and relatively small amplitude of swing and in position to be moved by the diaphragm when on its greater amplitude of swing, thereby to cause the take-up mechanism to function.

8. As an article of manufacture, an attachment for use with a brake mechanism complete per se and which mechanism includes a motor having a main casing with a pneumatically actuated diaphragm therein, a cam and an associated cam shaft for actuating the brake mechanism, an arm swinging on the cam shaft, a worm gear on the cam shaft, a worm journaled in the arm and meshing with the worm gear, said worm gear and worm controlling the relation of cam shaft and arm, and a connection between the diaphragm and the arm to rock the same and thus cause the brake mechanism to function, said attachment forming a metering device for acting on the worm to vary the relation between the cam shaft and arm, said metering device including an index casing fashioned to be detachably attached to the main casing, a control for the metering device including a spring-loaded plunger slidably mounted in the index casing and disposed to intrude into the main casing and to be located in the path of movement of the diaphragm when moving on its braking stroke, a reducing driving connection provided with means for securing it to the arm and in driving relation to the worm to vary the relation of the cam shaft to the arm as an incident of diaphragm movement and a flexible power transmission between the control in the index casing and the reducing driving connection at the swinging arm.

ALBERT F. SHIELDS.

REFERENCES CITED

The following references are of record in the file of this patent:

UNITED STATES PATENTS

| Number | Name | Date |
|---|---|---|
| 1,782,571 | Hukill | Nov. 25, 1930 |
| 1,954,540 | Sanford | Apr. 10, 1934 |
| 2,144,086 | Rowland et al. | Jan. 17, 1939 |
| 2,243,469 | Moore | May 27, 1941 |
| 2,246,201 | Farmer | June 17, 1941 |
| 2,296,026 | Freeman | Sept. 15, 1942 |